United States Patent [19]

Pettijohn

[11] Patent Number: 5,286,819

[45] Date of Patent: Feb. 15, 1994

[54] POLYMERIZATION PROCESS EMPLOYING TRANSITION METAL CATALYST AND POLYMER PRODUCED

[75] Inventor: Ted M. Pettijohn, Bartlesville, Okla.

[73] Assignee: Phillips Petroleum Company, Bartlesville, Okla.

[21] Appl. No.: 59,144

[22] Filed: May 6, 1993

Related U.S. Application Data

[62] Division of Ser. No. 906,989, Jun. 30, 1992.

[51] Int. Cl.$^5$ .................... C08F 4/654; C08F 10/00
[52] U.S. Cl. .................... 526/125; 526/352
[58] Field of Search .................... 526/125

[56] References Cited

U.S. PATENT DOCUMENTS

| | | | |
|---|---|---|---|
| 3,163,611 | 12/1964 | Andersen et al. | 252/429 |
| 3,642,746 | 2/1972 | Kashiwa et al. | 260/88.2 |
| 4,006,101 | 2/1977 | Matsuura et al. | 252/429 C |
| 4,085,276 | 4/1978 | Toyota et al. | 526/122 |
| 4,330,649 | 5/1982 | Kioka et al. | 526/125 |
| 4,477,587 | 10/1984 | Band | 502/111 |
| 4,499,194 | 2/1985 | Harada et al. | 502/8 |
| 4,525,469 | 6/1985 | Ueda et al. | 502/125 |
| 4,528,339 | 7/1985 | Coleman, III et al. | 526/127 |

OTHER PUBLICATIONS

"Modification of Catalysts for Propylene Polymerization: Alcohols and Lewis Bases"-A. J. Sivak and Y. V. Kissin, 22 J. Polymer Sci. Polymer Chem. Ed. 3739-46 (1984).

Primary Examiner—Edward J. Smith
Attorney, Agent, or Firm—Marianne H. Michel

[57] ABSTRACT

A polymerization catalyst is formed by contacting an alcohol with a transition metal compound. In a second embodiment, a solution is formed by contacting a Group IIA or Group IIB metal halide and an alcohol, the solution is then contacted with a transition metal compound to produce a catalyst. Either catalyst can be combined with an organometallic cocatalyst. Polymers with multimodal molecular weight distribution are produced when a diol is used to prepare the catalyst and an organoaluminum halide is used as cocatalyst. Polymers with broad molecular weight distribution of the unimodal type are produced when using a trialkylaluminum cocatalyst.

9 Claims, 2 Drawing Sheets

POLYMERIZATION PROCESS EMPLOYING TRANSITION METAL CATALYST AND POLYMER PRODUCED

This is a divisional of copending application Ser. No. 07/906,989, filed Jun. 30, 1992.

BACKGROUND

The present invention relates to transition metal catalysts.

In the polymerization of alpha-olefins, it is known to use catalysts comprising a transition metal compound and an organometallic compound. It is further known that the productivity of such catalysts can generally be improved if the transition metal compound is employed in conjunction with a metal halide, such as $MgCl_2$. The catalysts described above produce polymers of narrow molecular weight distribution (MWD) and do not exhibit a multimodal or broad molecular weight distribution.

For many applications, such as extrusion and molding processes, it is highly desirable to have polymers which have a broad molecular weight distribution of the unimodal or the multimodal type. Such polymers evidence excellent processability, i.e., they can be processed at a faster throughput rate with lower energy requirements with reduced melt flow perturbations.

It is also highly desirable to produce multimodal or broad molecular weight distribution polymers directly in a single reactor, without having to blend polymers having different molecular weights and distribution in order to obtain the advantages of this invention.

SUMMARY OF THE INVENTION

It is an object of this invention to provide a catalyst useful for the polymerization of olefins of broad molecular weight distribution.

It is another object of this invention to provide a method to prepare a high productivity catalyst useful for the polymerization of olefins.

It is another object of this invention to provide a method for the polymerization of olefins with a multimodal molecular weight distribution in a single reactor.

It is another object of this invention to provide a method for the polymerization of olefins with improved processability.

In accordance with the invention, a process to produce a catalyst is provided comprising admixing an alcohol neat or in liquid diluent and a transition metal compound wherein the transition metal is selected from Group IVA and Group VA metals of the Periodic Table.

In accordance with another aspect of the invention, a process to produce a catalyst is provided comprising admixing a metal halide wherein the metal is selected from Group IIA and Group IIB metals of the Periodic Table and an alcohol to form a solution; the thus formed solution is then combined with a transition metal compound wherein the transition metal is selected from Group IVA and Group VA metals.

In accordance with other aspects of the invention a catalyst produced by the above described process, a polymerization process employing the catalyst, and the polymer produced are provided.

BRIEF DESCRIPTION OF THE DRAWINGS

The drawings are a graphic representation of the results obtained in the Examples II and III.

DETAILED DESCRIPTION OF THE INVENTION

Catalyst

Figure 1:
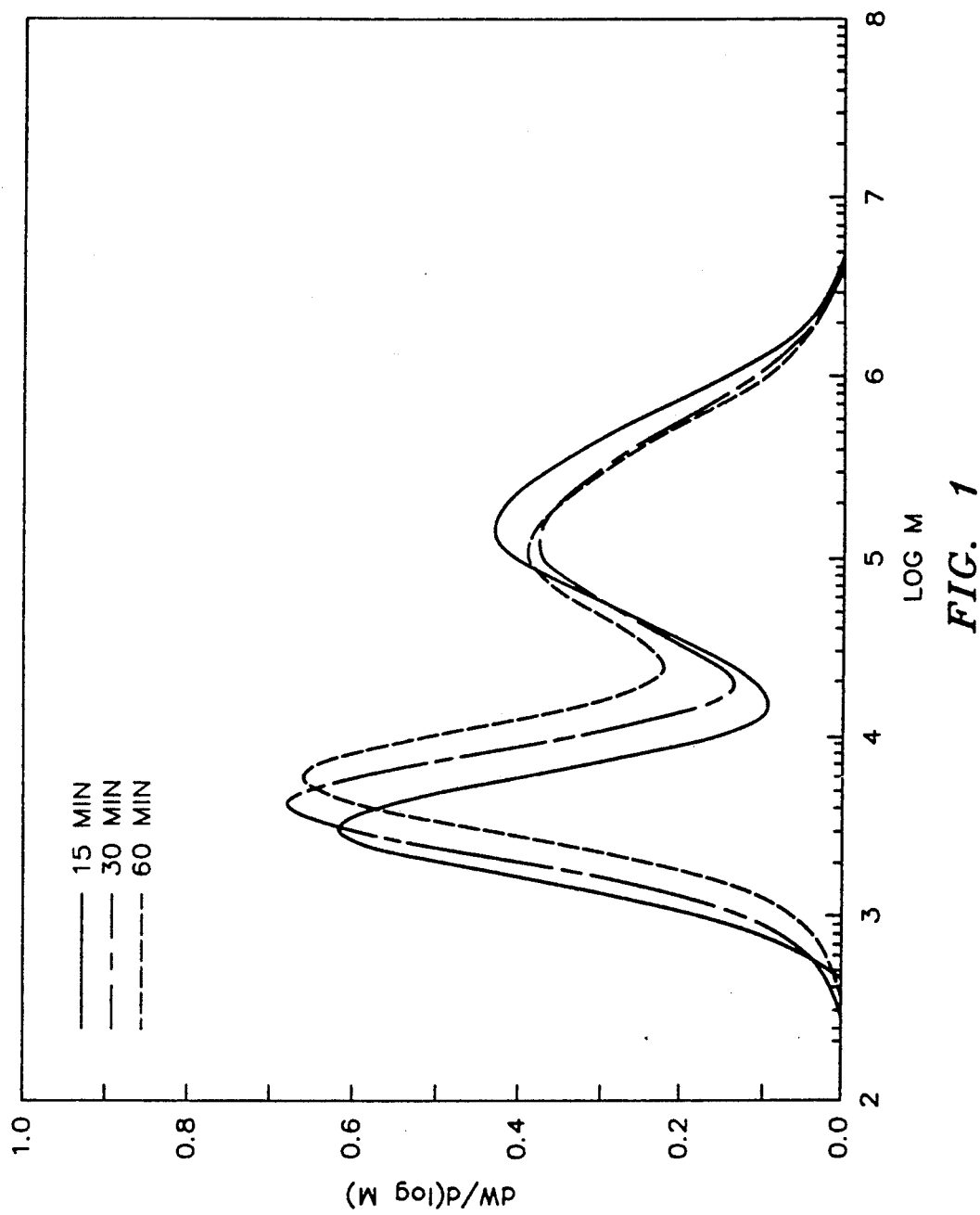
FIG. 1 represents the results in Table 2.

The present invention is concerned with new, high productivity catalysts that in a preferred embodiment produce polymers having multimodal molecular weight distributions. In the first embodiment of the present invention, an alcohol is combined with a transition metal compound to form a catalyst. In another embodiment of the invention, the catalysts employ metal halides which are contacted with the alcohol to form a solution; a solid precipitate is formed when the solution is combined with a transition metal compound. Optionally an organometal cocatalyst can be used with the catalyst to produce a catalyst.

Alcohols that can be used include either monohydroxy or polyhydroxy alcohols. Aliphatic or aromatic alcohols can be employed. The aliphatic alcohols can be saturated or unsaturated. Suitable monohydroxy alcohols are those containing 1 to 20 carbon atoms, preferably from 2 to 16 carbon atoms. Examples of suitable monohydroxy alcohols include methanol, ethanol, isopropanol, hexanol, 2-ethylhexanol, octanol, decanol, dodecanol, and hexadecanol.

Suitable polyhydroxy alcohols include diols and glycerols. Suitable diols are diols containing 2 to 20 carbon atoms, preferably 1,2 diols containing from 2 to 16 carbon atoms. Examples of suitable diols include 1,2-ethanediol, 1,2-propanediol, 1,3-propanediol, 1,4-hexanediol, 1,2-octanediol, 1,10-decanediol, 1,12-dodecanediol, 1,2-hexadecanediol and 1,20-eicosanediol. Diols are especially preferred for producing polymers having multimodal molecular weight distribution.

The transition metal compound is selected from the halide containing compounds of elements of Group IVA and Group VA of the Periodic Table. As used herein by the term "Periodic Table" is meant the Periodic Table of Elements as defined under the previous IUPAC form on the inside front cover of *Handbook of Chemistry and Physics*, 70th Edition, CRC Press Inc., (1990). Currently preferred transition metal compounds include halides such as titanium tetrachloride, vanadium oxychloride, zirconium oxychloride, and zirconium tetrachloride. Particularly preferred transition metal compounds include titanium tetrahalides, with titanium tetrachloride being the most preferred due to excellent results.

The moles of alcohol per mole of transition metal compound to be employed according to the invention is generally in the broad range of about 1 to about 30, preferably in the range of about 2 to about 20, and most preferably in the range of 3 to 15.

The transition metal compound and alcohol can be contacted neat or in a liquid diluent. Examples of suitable diluents include n-pentane, n-hexane, n-heptane, cyclohexane, benzene, toluene, xylenes, and mixtures thereof. Toluene is the preferred diluent.

Generally, the amount of diluent employed can vary over a broad range. Usually the amount of diluent per gram of transition metal compound is within the range of about 5 to 300 grams, preferably in the range of about 10 to about 200 grams and most preferably from 10 to 100 grams.

The temperature employed in contacting the alcohol and the transition metal compound is generally in the range of about $-25°$ C. to about $250°$ C., preferably about $0°$ C. to about $200°$ C., and most preferably from $0°$ C. to $100°$ C. The pressure employed can vary over a wide range, generally being in the range of about 0 to about 200 psig, preferably in the range of about 0 to about 100 psig, and most preferably in the range of 0 to 50 psig. The time of reaction can vary broadly from about 1 minute to about 72 hours, preferably from about 5 minutes to 24 hours, and most preferably from 5 minutes to 10 hours.

In a preferred embodiment of the invention, metal halides are contacted with an alcohol to form a metal halide solution, and the thus formed solution is then combined with a transition metal compound as contrasted with directly contacting the alcohol and transition metal as in the first embodiment.

The metal halide compound is selected from metal dihalides or metal hydroxyhalides of the Group IIA and Group IIB metals of the Periodic Table. Suitable metals in the metal halide that can be employed include beryllium, magnesium, calcium and zinc. Some suitable metal halide compounds include for example, beryllium dichloride, beryllium dibromide, beryllium hydroxyiodide, magnesium dichloride, magnesium bromide, magnesium hydroxychloride, magnesium diiodide, magnesium difluoride, calcium dichloride, calcium dibromide, calcium hydroxybromide, zinc dichloride, zinc difluoride, and zinc hydroxychloride.

Preferably, the metal halide employed is selected from magnesium dihalides, magnesium hydroxyhalides, or mixtures thereof. Examples of what is meant by magnesium dihalides are $MgCl_2$, $MgF_2$, $MgI_2$, $MgBr_2$. Examples of what is meant by magnesium hydroxyhalides include $Mg(OH)Cl$, $Mg(OH)Br$, $Mg(OH)I$. It is also within the scope of the invention to use metal halides complexed with one or more electron donors, such as compounds of the formula $MgCl_2nED$ wherein ED is electron donor. Examples of typical electron donors are water, ammonia, hydroxylamines, alcohols, ethers, carboxylic acids, esters, acid chlorides, amides, nitriles, amines, dioxane, and pyridine. Examples of some specific magnesium halide complexes include $MgCl_2 \cdot H_2O$, $MgCl_2 \cdot 2H_2O$, $MgCl_2 \cdot 6H_2O$, $MgCl_2 \cdot 4H_2O$, $MgBr_2 \cdot 2H_2O$, $MgBr \cdot H_2O$, $MgBr_2 \cdot 4H_2O$, $MgBr \cdot 6H_2O$, $MgI_2 \cdot 8H_2O$, $MgI_2 \cdot 6H_2O$, $MgCl_2 \cdot 6NH_3$, $MgCl_2 \cdot NH_3$, $MgBr_2 \cdot 2NH_3$, $MgI_2 \cdot 6NH_3$, $MgI_2 \cdot NH_3$, $MgCl_2 \cdot 2NH_2OH \cdot 2H_2O$, $MgCl_2 \cdot 6CH_3OH$, $MgCL_2 \cdot 6C_2H_5OH$, $MgCl_2 \cdot 6C_3H_7OH$, $MgCl_2 \cdot 6C_4H_9OH$, $MgBr_2 \cdot 6C_3H_7OH$, $MgCl_2 \cdot CH_3OH$, $MgCl_2 \cdot (C_2H_5)_2O$, $MgCl_2 \cdot 6CH_3CO_2H$, $MgCl_2 \cdot 2CH_3CO_2C_2H_5$, $MgBr_2 \cdot 2C_6H_5CO_2C_2H_5$, $MgBr_2 \cdot 4CO(NH_2)_1$, and $MgI_2 \cdot 6CH_3CONH_2$, $MgBr_2 \cdot 4CH_3CN$, $MgCl_2 \cdot 3C_2H_4(NH_2)_2$, $MgCl_2 \cdot 2N(C_2H_4O)_3$, $MgCl_2 \cdot 2C_6H_5NH_2 \cdot 6H_2O$, and $MgBr_2 \cdot 6C_6H_5NH_2$.

It is also possible to use mixed compositions containing the metal halide. Examples include compositions such as $MgCl_2 \cdot MgO \cdot H_2O$, $MgCl_2 \cdot 3MgO \cdot 7H_2O$, and $MgBr_2 \cdot 3MgO \cdot 6H_2O$. While metal hydroxyhalide compounds are known in the art, they are not as common and as readily available as metal dihalide compounds; therefore, metal dihalides are preferred.

It is currently preferred to use magnesium dihalides of the commercial variety which are conventionally called "anhydrous" but which are in fact magnesium dihalide hydrates containing. "Commercial anhydrous" magnesium dichlorides are a typical example. Of the magnesium dihalides, magnesium dichloride is particularly preferred because it is readily available and relatively inexpensive and has provided excellent results.

Alcohols that can be used in this embodiment, as in the first embodiment, include either monohydroxy or polyhydroxy alcohols. Aliphatic or aromatic alcohols can be employed. The aliphatic alcohols can be saturated or unsaturated. Suitable monohydroxy alcohols are those containing 1 to 20 carbon atoms, preferably from 2 to 16 carbon atoms. Examples of suitable monohydroxy alcohols include methanol, ethanol, isopropanol, hexanol, 2-ethyl hexanol, octanol, decanol, dodecanol, and hexadecanol.

Suitable polyhydroxy alcohols include diols and glycerols. Suitable diols are diols containing 2 to 20 carbon atoms, preferably 1,2 diols containing from 2 to 16 carbon atoms. Examples of suitable diols include 1,2-ethanediol, 1,2-propanediol, 1,3-propanediol, 1,4-hexanediol, 1,2-octanediol, 1,10-decanediol, 1,12-dodecanediol, 1,2-hexadecanediol and 1,20-eicosanediol. Diols are especially preferred for producing polymers having multimodal molecular weight distribution.

The alcohol is present in an amount sufficient to form a solution with the metal halide. The amount required to form a solution will vary depending on the alcohol used and the metal halide present. The moles of alcohol per mole of metal halide to be employed according to the invention is generally in the broad range of about 1 to about 30, preferably in the range of about 2 to about 20, and most preferably in the range of 3 to 15.

The metal halide and alcohol can be combined with a suitable dry diluent (i.e. one essentially free of water). Typical diluents include, for example, normally liquid hydrocarbons having 3 to 12 carbon atoms such as n-heptane, methylcyclohexane, toluene, xylenes, and mixtures thereof. Toluene is the preferred diluent.

Generally, the amount of diluent employed can vary over a broad range. Usually the amount of diluent per gram of metal halide is within the range of about 5 to 300 grams, preferably in the range of about 10 to about 200 grams and most preferably from 10 to 100 grams.

The temperatures employed in contacting the metal halide and the alcohol can vary over a wide range, generally being in the range of about $0°$ C. to about $250°$ C., preferably from about $15°$ C. to $100°$ C., and most preferably from $20°$ C. to $75°$ C. The pressure employed can vary over a wide range, generally being in the range of about 0 to about 200 psig, preferably in the range of about 0 to about 100 psig, and most preferably in the range of 0 to 50 psig. Conditions are selected so that the reaction product will be in solution. The time of reaction can vary broadly from about 1 minute to about 72 hours, preferably from about 5 minutes to about 24 hours, and most preferably from 5 minutes to 10 hours.

The metal halide solution is then contacted with a transition metal compound to produce a solid catalyst. As in the first embodiment, the transition metal compound is selected from the halide containing compounds of elements of Group IVA or Group VA of the Periodic Table. Currently preferred transition metal compounds include halides such as titanium tetrachloride, vanadium oxychloride, zirconium oxychloride, and zirconium tetrachloride. Particularly preferred transition metal compounds include titanium tetrahalides, with titanium tetrachloride being the most preferred due to excellent results.

The transition metal compound can be contacted neat or in a liquid diluent. Examples of suitable diluents include liquid hydrocarbons having 3 to 12 carbon atoms such as n-pentane, n-hexane, n-heptane, cyclohexane, methylcyclohexane, benzene, toluene, and m-xylene.

The temperature employed in contacting the metal halide solution and the transition metal compound is generally in the range of about −25° C. to about 250° C., preferably about 0° C. to about 200° C., and most preferably from 0° C. to 100° C. The pressure employed can vary over a wide range, generally being in the range of about 0 to about 200 psig, preferably in the range of about 0 to about 100 psig, and most preferably in the range of 0 to 50 psig. The time of reaction can vary broadly from about 1 minute to about 72 hours, preferably from about 5 minutes to 24 hours, and most preferably from 5 minutes to 10 hours.

While the moles of transition metal compound per mole of metal halide can be selected over a wide range, generally the range will be from about 0.1 to about 1000, preferably from about 0.5 to about 500, and most preferably from 1 to 100.

Following the treatment of the metal halide solution with the transition metal compound to form a solid catalyst, the surplus transition metal compound can be removed by washing with a dry diluent. Typical diluents include, for example, normally liquid hydrocarbons having 3 to 12 carbon atoms such as n-pentane, n-hexane, n-heptane, cyclohexane, methylcyclohexane, and mixtures thereof. Cyclohexane is preferred. Washing can be accomplished, for example, by mixing the solids with diluent, allowing the solids to settle or centrifuging, and then removing the liquid by decanting or siphoning. The resulting product can be stored under dry nitrogen until use.

Polymerization

In the polymerization of olefins, the inventive catalysts of either embodiment can be used with a suitable cocatalyst of the type generally used with titanium-containing olefin polymerization catalysts to form a catalyst. Typical examples include organometallic compounds of Groups IA, IIA, IIB, and IIIA of the Periodic Table, i.e. alkali metal alkyls or aryls, dialkylmagnesium, dialkylzinc, Grignard reagents, and organoaluminum compounds.

For producing a polymer exhibiting multimodal molecular weight distribution, the preferred organometallic compounds are the organoaluminum halides of the general formula $R_nAlX_{3-n}$ wherein R is a hydrocarbyl radical containing 1 to 20 carbon atoms, X is a halogen, preferably chlorine or bromine, and n is 1 to 2. Thus suitable types of organoaluminum halides are selected from dihydrocarbylaluminum halides or hydrocarbylaluminum dihalides, or mixtures thereof.

Examples include dimethylaluminum bromide, diethylaluminum chloride (DEAC), diisobutylaluminum bromide, didodecylaluminum chloride, dieicosylaluminum bromide, ethylaluminum dichloride (EADC), ethylaluminum sesquichloride (EASC), and mixtures thereof. Diethylaluminum chloride is especially preferred. Preferably the organometallic compound has been dissolved in hydrocarbon diluent.

For producing a polymer of the unimodal type exhibiting broad molecular weight distribution, the preferred organometallic compounds are the organoaluminum compounds of the general formula $R_nAlX_{3-n}$ wherein R is a hydrocarbyl radical containing 1 to 20 carbon atoms, X is a halogen or hydrogen, and n is 1–3. Examples of suitable organoaluminum compounds are trimethylaluminum, triethylaluminum, diethylaluminum hydride, triisopropenylaluminum, tricyclohexylaluminum, triisobutylaluminum, disobutylaluminum hydride, tridodecylaluminum, trieicosylaluminum, tribenzylaluminum, and mixtures thereof. For the preparation of polymers having narrow molecular weight distribution, it is currently preferred to use a trialkylaluminum cocatalyst such as triethylaluminum (TEA).

The amount of cocatalyst employed during the polymerization process can vary widely. Generally, the moles of organometal cocatalyst per mole of transition metal compound is about 0.1 to about 1000, preferably from about 1 to about 750, and most preferably from 5 to 700.

If desired, the catalyst can be mixed with a particulate diluent such as silica, silica-alumina, silica-titania, magnesium dichloride, magnesium oxide, polyethylene, polypropylene, and poly(phenylene sulfide), prior to using the composition in a polymerization process. The weight ratio of diluent to catalyst can range from about 0.01 to about 1000.

The inventive catalyst is useful for the polymerization of olefins. Typical polymerizable olefins include the aliphatic mono-olefins having 2 to 18 carbon atoms. The term polymerization is used herein to include both homo- and co-polymerization. In copolymerization other polymerizable monomers can be employed with the olefins, such as conjugated and nonconjugated dienes.

Suitable olefins include ethylene, propylene, 1-butene, 1-hexene, 4-methyl-1-pentene, styrene, 1,3-butadiene, isoprene, 1,5-hexadiene, trans-1,3-pentadiene, trans-1,3-hexadiene, trans-2-methyl-1,3-pentadiene, trans-3-methyl-1,3-pentadiene, 2,3-dimethyl-1,3-butadiene, trans-trans-2,4-hexadiene and mixtures containing 2 or more polymerizable unsaturated hydrocarbons. A particular group of olefins to be polymerized according to the invention includes unsaturated hydrocarbons having 2 to 6 carbon atoms and having at least one polymerizable ethylenic double bond. The inventive catalyst is particularly well suited for the preparation of ethylene homopolymers and copolymers which contain at least 90 mole percent, and preferably at least 95 mole percent ethylene. In one especially preferred embodiment 99 to 99.6 mole percent ethylene is used and 0.4 to 1 mole percent of a 4 to 10 carbon atom mono-1-olefin comonomer is used. In this embodiment, 1-hexene is a particularly desirable comonomer because of cost, availability and efficacy.

The polymerization reaction can be carried out in the presence of a diluent. Suitable as the diluent for the instant reaction system are inert hydrocarbons such as n-butane, isobutane, n-pentane, n-hexane, n-heptane, isooctane, cyclohexane, methylcyclohexane, benzene, toluene, xylene, tetralin, decalin, and other aliphatic, alicyclic, aromatic hydrocarbons, or mixtures thereof. The polymerization can be carried out in gas phase in the absence of diluent.

The catalysts of this invention can be employed in a batchwise, semi-continuous, or in a continuous polymerization process. Generally, the present polymerization reaction can be carried out at a temperature in the range of about 0° C. to about 200° C., preferably a temperature of about 25° C. to about 150° C., and most preferably from 25° C. to 100° C. Polymerization pressure can vary depending on the type of monomer, the catalyst activity, the desired degree of polymerization, etc. Generally polymerization pressure can be subatmospheric or superatmospheric pressure up to about 300 atmospheres, preferably from atmospheric pressure to about 100 atmospheres, and most preferably from atmospheric pressure to 50 atmospheres. Generally contacting time for the catalyst and the olefins can vary broadly from about 1 minute to about one week, more preferably from about 5 minutes to about 24 hours, and most preferably from 5 minutes to 5 hours.

Generally, when using a diluent in the instant polymerization reaction, it is convenient to introduce olefin into a dispersion containing the catalyst of the present invention in the diluent. The catalyst composition can be added in its whole amount to the polymerization system at the start or it can be added portion-wise over the period for the polymerization.

In a batch process of polymerizing ethylene, for example, a stirred autoclave is conditioned by purging with dry nitrogen and then with the hydrocarbon diluent that is to be employed in the polymerization process such as isobutane, for example. Generally, although order is immaterial, the cocatalyst is charged through an entry port followed by the catalyst. After closing the port, hydrogen, if used, can be added, and the hydrocarbon diluent can then be charged.

The reactor can then be heated to the desired reaction temperature, e.g. about 50° to about 120° C., the ethylene is admitted and maintained at a partial pressure within a range of about 0.5 to about 5.0 MPa (70-725 psig). At the end of the reaction period, generally about 1 hour for bench scale testing, the polymerization reaction is terminated by venting unreacted olefin and diluent. The reactor is then opened and the free-flowing white ethylene polymer can be collected and dried.

In a continuous process, for example, a suitable reactor such as a loop reactor is continuously charged with suitable quantities of diluent, catalyst, cocatalyst, olefin, and hydrogen, if used. The contact between the catalyst and monomer can be effected by various ways. For example, the olefin can be contacted with the catalyst in the form of a fixed bed, a slurry, a fluid bed, or a movable bed. Generally the loop reactor process is carried out at a temperature such that the resulting polymer is insoluble in the diluent, thus giving a slurry system. A continuous process is generally preferred in large scale commercial operations.

The polymerization reaction can be carried out in the presence of molecular hydrogen to regulate the molecular weight of the olefin polymers, as known in the art.

The reactor product is continuously or intermittently withdrawn, and the polymer recovered, e.g. flashing diluent and unreacted olefin and drying the product. In order to recover a produced polymer from the polymerization system, the crude polymerization product is for example taken up and subjected to flash separation, solvent extraction, hot filtration under a pressure, or centrifugal separation to yield a substantially pure polymeric product. A selection of the polymerization conditions for the process of the present invention, as well as the method for the recovery and purification of the polymeric product will be understood by those skilled in the art from the conventional low or modest pressure polymerization processes for olefins.

The following examples will serve to show the present invention in detail by way of illustration and not by way of limitation.

EXAMPLES

A further understanding of the present invention and its various aspects and advantages will be provided by the following examples.

In the following examples, unless indicated otherwise, the polymerization reactions were performed in a one liter, stirred autoclave. Prior to the reactions, the autoclave was washed thoroughly with dry cyclohexane and purged with nitrogen. The catalyst was suspended in cyclohexane and charged through a small port under a counter flow of ethylene. The reactor was sealed. Diluent, isobutane or cyclohexane (500 ml), was added to the reactor and the desired temperature obtained and maintained. Ethylene pressure was increased to a total reactor pressure of 550 psig. At the end of the reaction, diluent and ethylene were rapidly vented and the solid polymer was collected and dried. Unless otherwise indicated, the polymerizations in the examples were run using a temperature of 90° C. for 30 minutes.

The catalyst used in Examples I-II was prepared by combining 0.381 g $MgCl_2$, 2.935 g 1,2-octanediol and 20 mL toluene in a reaction vessel. A clear solution was formed by heating the mixture to 50° C. while stirring. The addition of 5.0 mL $TiCl_4$ produced an orange precipitate. The precipitate was dissolved by heating the reaction mixture to 80° C. for 1 hour. The solution was cooled slowly to room temperature to produce a crystalline solid. The precipitate was dissolved again by reheating the reaction mixture to 80° C. The solution was cooled slowly to room temperature while stirring, to produce a crystalline solid. The reaction mixture was centrifuged and the liquid removed. The solid catalyst was washed 3 times with 20 mL cyclohexane. A final 30 mL of cyclohexane was added to the solid. The concentration of the slurry was determined to be 66 mg catalyst/mL.

Terms used in the tables of the examples are defined as follows: Activity is expressed as grams of polymer per gram of catalyst per hour. MI is melt index, g/10 minutes, ASTM D1238-65T, conditions E. HLMI is high load melt index, g/10 minutes, ASTM D1238-65T, condition F. Mw is the weight average molecular weight. Mn is the number average molecular weight. HI is heterogeneity index and is the ratio of Mw/Mn. Al/Ti is the ratio of moles of organoaluminum compound per mole of Ti. $H_2$ is the partial pressure of hydrogen, $\Delta P(H_2)$, as psig, measured as the pressure drop from a 1 liter vessel.

EXAMPLE I

In Example I, polymerizations were carried out using the catalyst described above and cocatalyst triethylaluminum (TEA). Cyclohexane was used as diluent. The partial pressure of hydrogen was varied. The results are summarized in Table 1.

TABLE 1

| mmol Al | Catalyst | H$_2$ psig | Activity | MI | HLMI | Mw | Mn | HI |
|---|---|---|---|---|---|---|---|---|
| 0.7 TEA | 1.8 mg | 100 | 2,200 | 0.4 | 12.1 | 118 | 28 | 4.3 |
| 0.7 TEA | 1.8 mg | 50 | 3,900 | 0.1 | 2.9 | 382 | 63 | 6.1 |
| 0.7 TEA | 1.8 mg | 0 | 5,600 | 0 | 0.1 | — | — | — |

Table 1 demonstrates that useful catalysts are produced by reacting a metal halide, an alcohol, and a transition metal compound in conjunction with an organoaluminum cocatalyst. Good catalyst activity for producing polymer with high molecular weight and narrow molecular weight distribution is achieved using TEA as cocatalyst. Narrow molecular weight distribution is indicated by the low HI values.

EXAMPLE II

Another series of polymerization runs was carried out using the catalyst prepared in Example I and DEAC as cocatalyst, while varying the length of time used in the polymerization reaction. The partial pressure of hydrogen was 100 psig in all runs. Cyclohexane was used as diluent. The time in Table 2 is represented in minutes. The catalyst in Run 201 is a control containing 1,2-octanediol only, and no MgCl$_2$ or TiCl$_4$. The results are summarized in Table 2 and FIG. 1.

TABLE 2

| Run | mmol Al | Catalyst | Time | Activity | MI | HLMI | MW | MN | HI |
|---|---|---|---|---|---|---|---|---|---|
| 201 | 6 DEAC | 15 mg | 30 | 0 | | | | | |
| 202 | 2 DEAC | 3.6 mg | 15 | 9,000 | 0.2 | 21.2 | 151 | 4.4 | 34.7 |
| 203 | 2 DEAC | 3.6 mg | 30 | 7,100 | 0.2 | 42.7 | 128 | 4.9 | 25.9 |
| 204 | 2 DEAC | 3.6 mg | 60 | 5,700 | 0.5 | 120 | 115 | 7.3 | 15.7 |
| 205* | 2 DEAC | 3.6 mg | 30 | 11,800 | 0.3 | 18.1 | 169 | 6.2 | 27.4 |

*25 mL of hexene comonomer charged to the reactor

Table 2 demonstrates the unusual result of increasing molecular weight in the low molecular weight fraction with increasing time. The HI decreases as the molecular weight peaks grow closer together. Using cocatalyst DEAC produces high yields and bimodal molecular weight distribution as indicated by the high HI values.

EXAMPLE III

A series of polymerization runs using TiCl$_4$ as catalyst and DEAC as cocatalyst was carried out varying the aluminum to titanium ratio (Al/Ti). Solutions of varying concentrations of TiCl$_4$ were prepared and combined with 6 mmol DEAC as cocatalyst to produce the Al/Ti ratios in Table 3. Neither magnesium nor alcohol were present in the catalyst in this series of runs. In control Run 301, no TiCl$_4$ (catalyst) was present.

Figure 2:
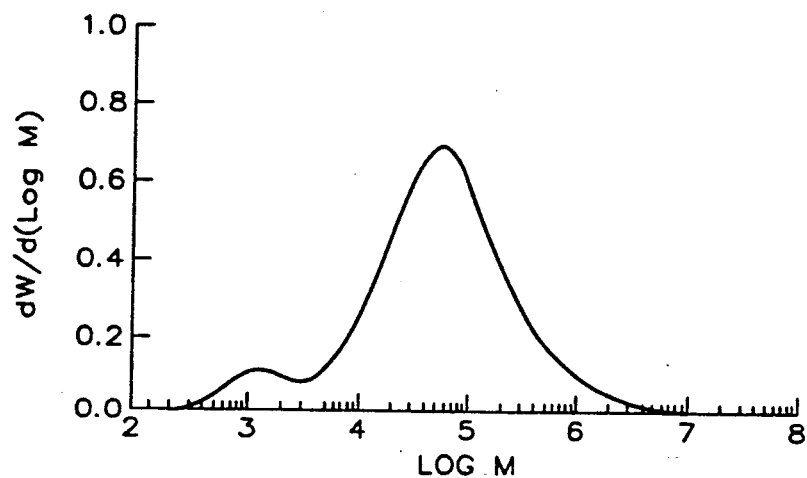
FIGS. 2, 3, and 4 represent the results in Table 3.
Figure 3:
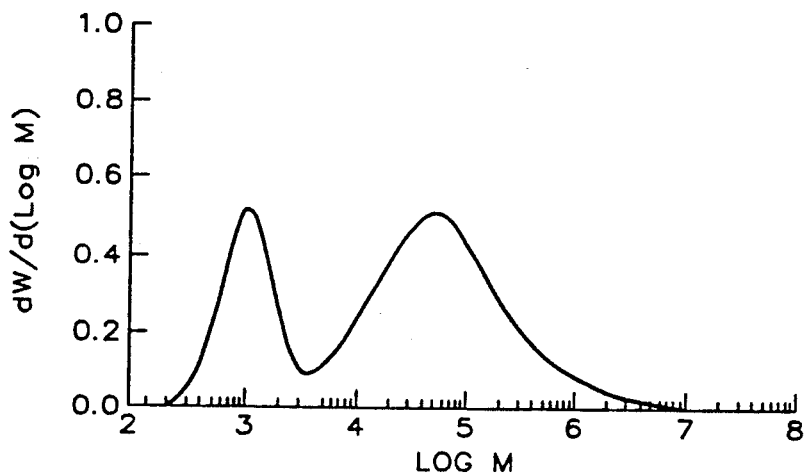
Figure 4:
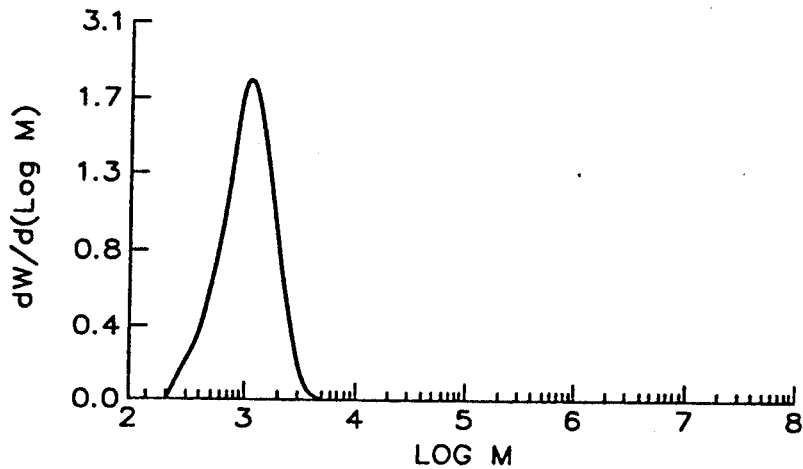

The results are summarized in Table 3 and FIGS. 2, 3, and 4. The partial pressure of hydrogen was 50 psig. The aluminum to titanium ratio varied from 50 to 300. The catalyst and cocatalyst were premixed prior to charging to the reactor. Isobutane was used as diluent. In this example TiCl$_4$ represents mg of TiCl$_4$ as catalyst, and Al is mmol DEAC as cocatalyst.

TABLE 3

| Run | Al/Ti | Al | TiCl$_4$ | Activity | MI | HLMI | Mw | Mn | HI |
|---|---|---|---|---|---|---|---|---|---|
| 301 | — | 6 | 0 | 0 | | | | | |
| 302 | 50 | 6 | 23 | 1,300 | 0.4 | 15.2 | 178 | 12 | 17.5 |
| 303 | 100 | 6 | 12 | 690 | 1.4 | 42.0 | 143 | 3.0 | 47.6 |
| 304 | 300 | 6 | 3.8 | 580 | — | — | 1.2 | 0.9 | 1.3 |

Table III demonstrates that useful catalysts are produced by combining a transition metal compound and an organoaluminum cocatalyst. Al/Ti ratios of 50 and 100 produce a polymer which exhibits multimodal molecular weight distribution which is demonstrated by the high HI values and FIGS. 2 and 3. An Al/Ti ratio of 300 produces a polymer of low molecular weight and narrow molecular weight distribution as shown by the low HI in Table 3 and FIG. 4. FIG. 2 represents the gel permeation chromatograph (GPC) of polymer produced using an Al/Ti ratio of 50, Run 302. FIG. 3 represents the GPC of polymer produced using an Al/Ti ratio of 150, Run 303. FIG. 4 represents the GPC of polymer produced using an Al/Ti ratio of 300, Run 304.

EXAMPLE IV

Catalysts were prepared by combining 1,2-octanediol and TiCl$_4$ using varying Ti/Diol ratios. TiCl$_4$ and 1,2-octanediol were diluted using different amounts of cyclohexane. The catalysts were prepared by combining 5 mL cyclohexane and varying amounts of diluted TiCl$_4$ and 1,2-octanediol. The mixtures were heated to 80° C. and cooled. Five mLs of toluene were added to the catalysts of Runs 402 and 403. The polymerizations were carried out using isobutane as diluent, 50 psig hydrogen, and a temperature of 90° C. In Table 4, Ti/Diol is the mole ratio of Ti to diol. Catalyst is mg of TiCl$_4$. No magnesium is present in the catalyst.

TABLE 4

| Run | mmol Al | Catalyst | Time | Ti/Diol | Activity | Mw | Mn | HI |
|---|---|---|---|---|---|---|---|---|
| 401 | 6 DEAC | 3.6 | 60 | 1 | 730 | 0.9 | 0.7 | 1.42 |
| 402 | 6 DEAC | 18 | 30 | 2 | 1,200 | 138 | 3.9 | 35.3 |
| 403 | 6 DEAC | 18 | 30 | 1 | 1,000 | 134 | 2.9 | 46.2 |

Table 4 demonstrates that useful catalysts are produced by combining an alcohol and a transition metal compound. Runs 402 and 403 produced a polymer having a multimodal molecular weight distribution, as indicated by the high HI value.

While this invention has been described in detail for the purpose of illustration, it is not to be construed or limited thereby, but is intended to cover all changes and modifications within the spirit and scope thereof.

That which is claimed is:

1. A process for the polymerization of olefin monomers comprising contacting said olefin monomers under polymerization conditions with a catalyst system:
    wherein said catalyst system is produced by a process comprising:
    (1) contacting magnesium dichloride with 1,2-octanediol to form a solution;
    (2) contacting the solution of (1) with titanium tetrachloride to form a catalyst; and
    (3) contacting said catalyst with a diethylaluminum chloride cocatalyst to form said catalyst system.

2. A process according to claim 1 wherein said polymerization conditions comprise a temperature of about 0° to about 200° C. and a pressure up to 300 atmospheres.

3. A process according to claim 2, wherein said polymerization conditions comprise a temperature of 25° C. to 150° C. and a pressure in the rangs of atmospheric to 50 atmospheres.

4. A process according to claim 1 wherein said olefin monomers comprise ethylene.

5. A process according to claim 4 wherein said olefin monomers further comprise hexene.

6. A process according to claim 1 wherein said cocatalyst is present in an amount in the range of about 0.1 moles to about 500 moles per mole of titanium tetrachloride.

7. A process according to claim 6 wherein said cocatalyst is present in an amount in the range of about 1 mole to about 100 moles per mole of titanium tetrachloride.

8. A process for the polymerization of ethylene comprising contacting said ethylene with a catalyst system under conditions comprising: a temperature of 25° C. to 100° C. and a pressure in the range of atmospheric to 50 atmospheres;

wherein said catalyst system is produced by a process comprising:
(1) contacting magnesium dichloride with 1,2-octanediol to form a solution;
(2) contacting the solution of (1) with titanium tetrachloride to form a catalyst; and
(3) contacting said catalyst with diethylaluminum chloride to form said catalyst system.

9. A process according to claim 8 where there is present 0.4 to 1 mole percent of hexene and 99 to 99.6 mole percent of said ethylene.

* * * * *